R. W. BUTLER.
CLUTCH.
APPLICATION FILED JULY 6, 1908. RENEWED JUNE 11, 1909.
947,962.
Patented Feb. 1, 1910.
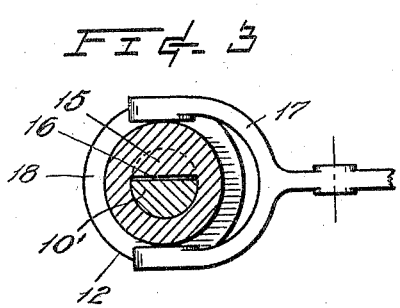
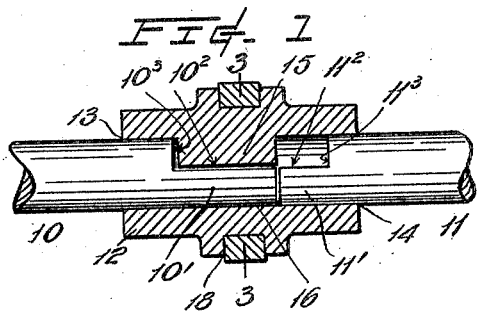
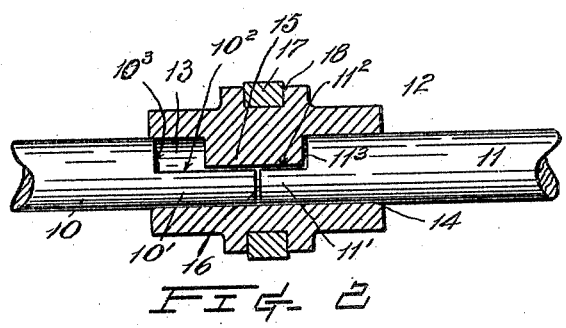
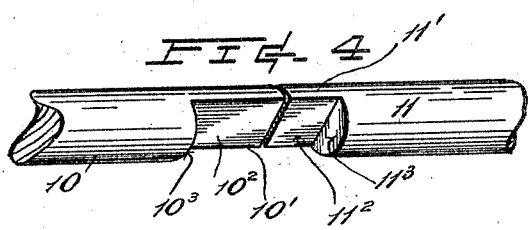
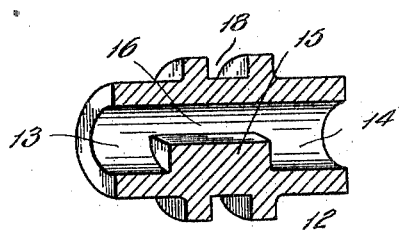
WITNESSES:
INVENTOR:
Robert W. Butler
BY
Pierre Barnes
ATTORNEY.

UNITED STATES PATENT OFFICE.

ROBERT W. BUTLER, OF SUNNYSIDE, WASHINGTON.

CLUTCH.

947,962.   Specification of Letters Patent.   Patented Feb. 1, 1910.

Application filed July 6, 1908, Serial No. 442,129.   Renewed June 11, 1909.   Serial No. 501,653.

*To all whom it may concern:*

Be it known that I, ROBERT W. BUTLER, a citizen of the United States, residing at Sunnyside, in the county of Yakima and State of Washington, have invented certain new and useful Improvements in Clutches, of which the following is a specification.

This invention relates to shaft couplings and, more especially, to that class known as clutch couplings.

The object of the invention is the provision of a coupling of this nature which is of inexpensive construction and is effectual in operaion.

The invention consists in the novel construction, adaptation and arrangement of parts, as will be hereinafter described and claimed.

In the drawings, Figure 1 is a longitudinal section of a coupling embodying my invention; and illustrated with the shafting disengaged with respect to each other. Fig. 2 is a similar view with the shafting in coupled condition. Fig. 3 is a transverse sectional view taken through line 3—3 of Fig. 1. Fig. 4 is a perspective view of the shaft ends with the coupling-sleeve removed. Fig. 5 is a view partly in longitudinal section and partly in perspective of the coupling-sleeve.

The reference numerals 10 and 11 designate two shafts in axial alinement and which are to be coupled. These shafts are halved to provide terminal tongues 10' and 11' of a semi-circular configuration in cross-section and afford diametrically arranged plane faces $10^2$ and $11^2$, which respectively terminates in shoulders $10^3$ and $11^3$. The length of the tongue 10' upon one of the shafts is somewhat longer than the tongue 11' upon the other. 12 is a sleeve, or muff, of greater length than the combined lengths of both of the aforesaid tongues and is bored to furnish cylindrical sockets 13 and 14 at the opposite ends of diameters corresponding to that of the shafts 10 and 11, respectively; and of depths somewhat greater than the length of the shorter of the two tongues, 11'. Intermediate the sockets, there is provided within the sleeve a block 15 of less length than the shaft-tongue 10', and the two sockets are connected by a way 16 of such form as to accommodate either of the shaft-tongues. The sleeve is arranged to be shifted longitudinally of the shafts, as by a forked lever 17 engaging in a peripheral groove 18 of the sleeve.

Assuming that the shafts are in uncoupled condition, as represented in Fig. 1, when the tongue 10' of shaft 10 occupies the way 16 and by reason thereof is rotatably engaged with the sleeve; while the other shaft is free to rotate in the socket 14 by shifting the sleeve so that the tongue 11' of shaft 11 occupies the way 16 jointly with the tongue of the other shaft 10, then it is evident that both shafts must rotate as a single piece.

The invention is extremely simple and efficient.

Having described my invention, what I claim as new and desire to secure by Letters-Patent, is—

1. As a means for connecting shafts, a sleeve provided interiorly with a block and with two end sockets which are connected by a semi-cylindrical shaped way, in combination with the shafts formed with their adjacent ends halved to provide a tongue upon each and which are arranged for engagement with the sleeve when the latter is adjusted to accommodate both of said tongues.

2. As a means for connecting shafting, a sleeve provided with a socket at each end which are connected by a way and with an intermediate block, in combination with the shafts provided with extremities arranged to engage the sleeve when the latter is shifted to cause the shaft extremities to be within said way.

ROBERT W. BUTLER.

Witnesses:
  PIERRE BARNES,
  S. R. JONES.